(12) United States Patent
Wiegert et al.

(10) Patent No.: US 7,688,072 B1
(45) Date of Patent: Mar. 30, 2010

(54) PORTABLE MAGNETIC SENSING SYSTEM FOR REAL-TIME, POINT-BY-POINT DETECTION, LOCALIZATION AND CLASSIFICATION OF MAGNETIC OBJECTS

(75) Inventors: Roy Wiegert, Panama City, FL (US); John Oeschger, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 391 days.

(21) Appl. No.: 11/974,004

(22) Filed: Sep. 18, 2007

(51) Int. Cl.
*G01V 3/08* (2006.01)

(52) U.S. Cl. .................. 324/326; 324/247; 324/225; 324/345

(58) Field of Classification Search .................. None
See application file for complete search history.

(56) References Cited

U.S. PATENT DOCUMENTS

| | | | |
|---|---|---|---|
| 6,476,610 B1 * | 11/2002 | Wiegert et al. ............... 324/345 |
| 6,841,994 B1 * | 1/2005 | Wiegert ........................ 324/244 |
| 7,038,458 B1 * | 5/2006 | Wiegert ........................ 324/345 |
| 7,425,829 B2 * | 9/2008 | Zeller et al. .................. 324/326 |
| 2003/0102868 A1 * | 6/2003 | Brune et al. .................. 324/326 |

* cited by examiner

*Primary Examiner*—Jay M Patidar
(74) *Attorney, Agent, or Firm*—James T. Shepherd

(57) ABSTRACT

A portable magnetic anomaly sensing system includes a non-magnetic support structure defined by a rigid beam and a rigid frame coupled thereto. Triaxial magnetometer (TM) sensors are rigidly coupled to the frame with one TM sensor being positioned at each vertex of a cubic space. Each TM sensor is positioned such that all respective X,Y,Z magnetic sensing axes are mutually parallel to one another. A data acquisition system is mechanically coupled to the beam such that any magnetic elements of the data acquisition system do not adversely affect accuracy of the TM sensors. The data acquisition system samples the sensed magnetic field data from all TM sensors synchronously with a timing signal. A processor is mechanically coupled to the beam such that any magnetic elements of the processor do not adversely affect accuracy of the TM sensors. The processor applies a magnetic scalar triangulation and ranging (STAR) processing scheme to the digitized magnetic field data in order to determine a position vector and a magnetic moment vector. One or more output generation devices are used to generate a human-discernable output to the position vector and the magnetic moment vector.

18 Claims, 3 Drawing Sheets

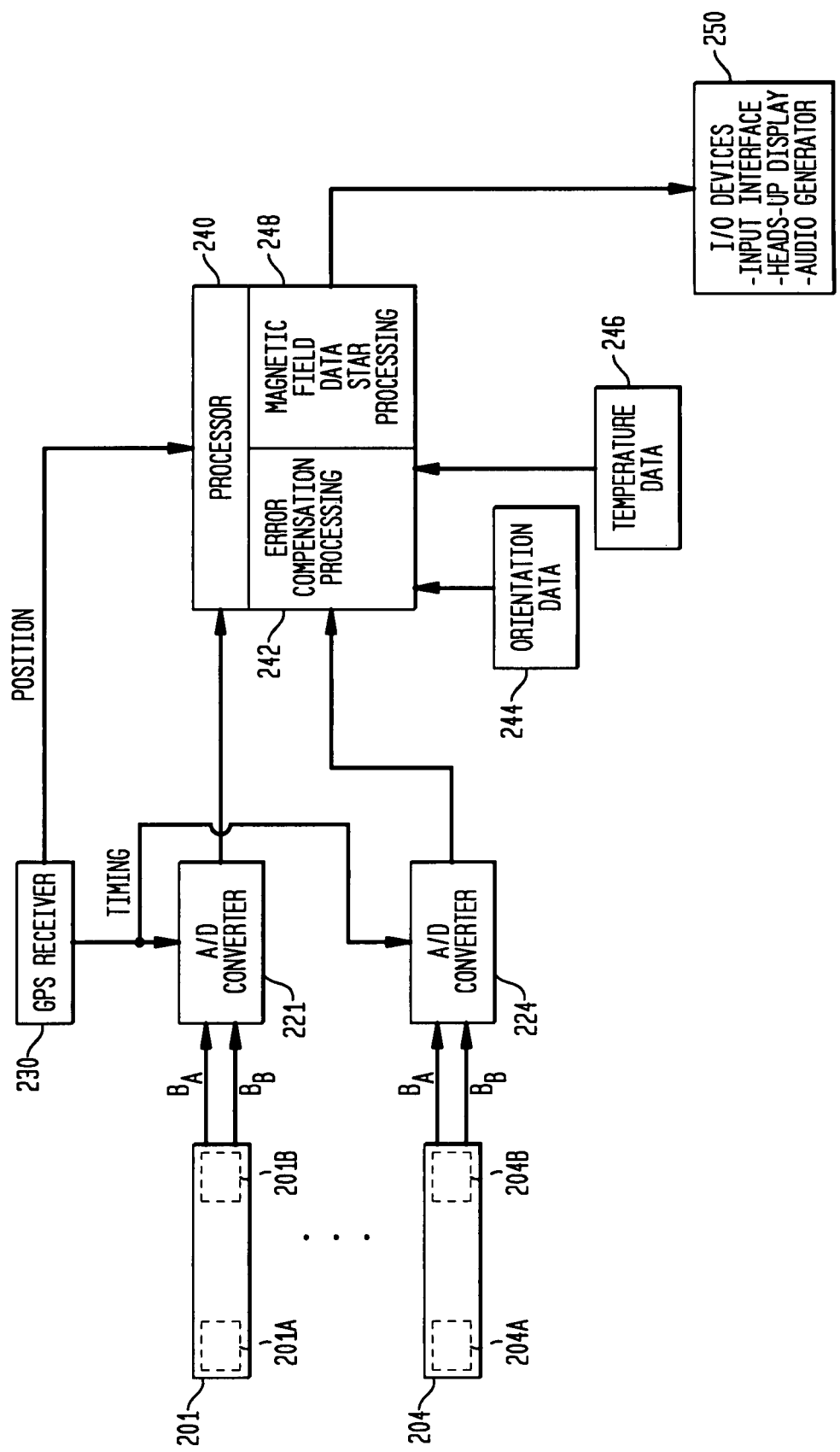

PORTABLE MAGNETIC SENSING SYSTEM FOR REAL-TIME, POINT-BY-POINT DETECTION, LOCALIZATION AND CLASSIFICATION OF MAGNETIC OBJECTS

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to magnetic sensing systems and more particularly to a portable magnetic sensing system that can be carried by a single individual and used to perform real-time, point-by-point detection, localization and classification of magnetic objects.

BACKGROUND OF THE INVENTION

There are a few number of military and commercial situations that would benefit from the availability of a portable magnetic sensing system to perform real-time, point-by-point "Detection, Localization and Classification" (DLC) of magnetic objects (or "targets"). For example, this type of system is needed when searching for hidden and buried "unexploded ordnance" (UXO), e.g., bombs, artillery shells, mines, etc., that are typically found in former defense sites and past/present war zones.

As used herein, the term "real-time" means that the time interval between sensing system's measurement and display of target DLC parameters (i.e., the target's presence, location and magnetic signature) should be on the order of a few seconds or less. The term "point-by-point" indicates that the portable sensing system should be able to provide a real-time indication of DLC parameters at each and every point in which the sensing system can detect the target. Further, the portable magnetic sensing system should be easily carried and operated by a single individual and be generally adaptable to a wide variety of highly mobile autonomous sensing platforms. However, because of the limitations of prior art magnetic sensing technologies, the prior art does not provide an easily portable magnetic sensing system that can provide effective real-time, point-by-point DLC of magnetic targets.

The limitations of prior art technologies primarily relate to their inability to adequately address the following technical factors that affect magnetic anomaly sensing:

(i) The magnetic field (B) that emanates from a magnetic object/target is a three-dimensional vector quantity that, in accordance with the well known "dipole approximation" is a function of six quantities; namely, the components of: a) the three-dimensional vector position (r) of the field point with respect to the target; and b) the three-dimensional vector magnetic moment or magnetic signature (M) of the object's ferrous materials. The magnitude of B rapidly decreases as the inverse cube of distance from the target, i.e., $B \propto r^{-3}$. At sensor-target distances of just a few meters, the magnetic field B of a typical UXO-sized object typically is very small (i.e., less than or equal to $10^{-9}$ tesla or 1 nano tesla (nT) or less). Thus, B rapidly changes with distance and constitutes a relatively short-range magnetic anomaly that typically is many orders of magnitude smaller (e.g., less than 1/50,000) than the relatively large and constant magnetic field of Earth ($B_E$).

(ii) The magnetic field of Earth $B_E$ is a locally fairly constant vector quantity whose magnitude typically is (depending on latitude) about 50,000 nT. Thus, if a magnetic sensing platform changes its orientation by 180°, it's vector field sensing elements could measure a total change of about 100,000 nT. The platform-orientation-dependent changes in measured field components constitute platform "motion noise" that are many orders of magnitude larger than the target's magnetic anomaly field (or signal).

(iii) In order to use a magnetic sensing system to perform point-by-point determination of the position r (i.e., the vector quantity indicative of range, elevation and bearing to a target) and the magnetic signature M of a magnetic object, the system must measure sufficient magnetic anomaly field data at each point in space nearly simultaneously to solve for the six unknown components of r and M. Therefore, in order to perform point-by-point DLC, a mobile sensing system must accurately and nearly simultaneously measure and discriminate at least six independent magnetic anomaly field variables that are convolved at every point with the tens of thousands of times greater magnetic "noise" from the Earth's field.

Thus, in order to perform effective localization and classification, a mobile magnetic sensing system has two major interrelated technical requirements. First, the system must have a wide dynamic range on the order of $10^5$ (or more) to discriminate multiple sub-nT signal components that are convolved within the Earth's 50,000 nT field. Second, the system must reduce the effects of sensor "motion noise" that can arise when the sensor system changes orientation in the Earth's field. Generally speaking, two magnetic sensing technologies have been developed to address the technical difficulties involved in detection and discrimination of magnetic anomaly fields. They are known as scalar total field magnetometry and tensor gradiometry. However, it is well known in the art that scalar total field magnetometers essentially measure, only one component of an object's magnetic anomaly field, i.e., the component that is parallel to the Earth's magnetic field direction. The resulting limited data sets provided by scalar magnetometry preclude the use thereof for real-time, point-by-point DLC of magnetic objects.

Tensor gradiometers measure the rate of change with distance (i.e., the gradient) of magnetic fields. Since the gradient of $B_E$ is fairly small (i.e., typically about 0.02 nT per meter), a gradiometer is able to discriminate a small magnetic anomaly field gradient within the large Earth's background field. Thus, tensor gradiometers can, in principle, perform point-by-point DLC. However, in practice, limitations of their sensor system embodiments, data sets and DLC methods cause the performance of prior art tensor gradiometers-based sensing systems to be degraded by changes in orientation of the sensing system's platform. Changes in sensor system orientation change the gradient component measurements and generate motion noise that can greatly reduce the range, accuracy and effectiveness of a conventional prior art tensor gradiometer. Therefore, in practice, conventional tensor gradiometers require sensor platform motion to be constrained to straight line trajectories with very little change in orientation. Such constraints on motion greatly reduces the range of potential applications for conventional gradiometers.

U.S. Pat. No. 6,476,610 (i.e., the "610 patent" as it will be referred to hereinafter) discloses a novel magnetic tensor gradiometer system and signal processing methods based on a magnetic "Scalar Triangulation and Ranging" (STAR) concept. The STAR concept was created to address the limitations on the practical mobility of conventional gradiometry and provide a more effective, motion noise restraint magnetic sensing technology for maneuverable sensing platform.

U.S. Pat. No. 6,841,994 (i.e., "the '994 patent" as it will be referred to hereinafter) discloses a multi-toner STAR technology that uses three-dimensional arrays of triaxial vector magnetometers to develop unique, rotationally invariant (i.e., platform motion noise resistant) scalar "contractions" (or magnitudes) of magnetic gradient tensors. The tensor contractions provide a motion noise resistant data base that the STAR method uses to perform point-by-point triangulation of a magnetic target's location and to determine the target's magnetic signature. However, the '610 and '994 patents do not specifically disclose means and methods for application of the STAR technology to address the technical challenges involved in the development of a man-portable magnetic sensing system for real-time, point-by-point DLC of magnetic objects.

SUMMARY OF THE INVENTION

Accordingly, it is an object of the present invention to provide an improved magnetic anomaly sensing-based system for more effective real-time, point-by-point DLC of magnetic objects.

Another object of the invention is to provide a portable magnetic anomaly sensing system that can easily be carried and operated by a single individual and provide effective real-time, point-by-point DLC of magnetic objects.

Other objects and advantages of the present invention will become more obvious hereinafter in the specification and drawings.

In accordance with the present invention, a portable magnetic anomaly sensing system includes a support structure defined by a non-magnetic rigid beam and a non-magnetic rigid frame coupled to the beam in proximity to a first end thereof. The frame encompasses a three-dimensional cubic space. A plurality of triaxial magnetometer (TM) sensors are rigidly coupled to the frame with one TM sensor being positioned at each vertex of the cubic space. Each TM sensor is positioned such that all respective X,Y,Z magnetic sensing axes are mutually parallel to one another. Each TM sensor measures a local magnetic field and generates magnetic field data indicative thereof. A data acquisition system is mechanically coupled to the beam in proximity to a second end thereof such that any magnetic elements of the data acquisition system do not adversely affect accuracy of the TM sensors. The data acquisition system samples the sensed magnetic field data synchronously with a timing signal wherein digitized magnetic field data is generated. A processor is mechanically coupled to the beam in proximity to the second end thereof such that any magnetic elements of the processor do not adversely affect accuracy of the TM sensors. The processor applies a magnetic scalar triangulation and ranging (STAR) processing method to the digitized magnetic field data in order to determine a position vector and a magnetic moment vector. One or more output generation devices are used to generate a human-discernable output of the position vector and the magnetic moment vector.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 3 is a schematic view of a data collection and processing system in accordance with an embodiment of the present invention.

DETAILED DESCRIPTION OF THE INVENTION

Figure 1:
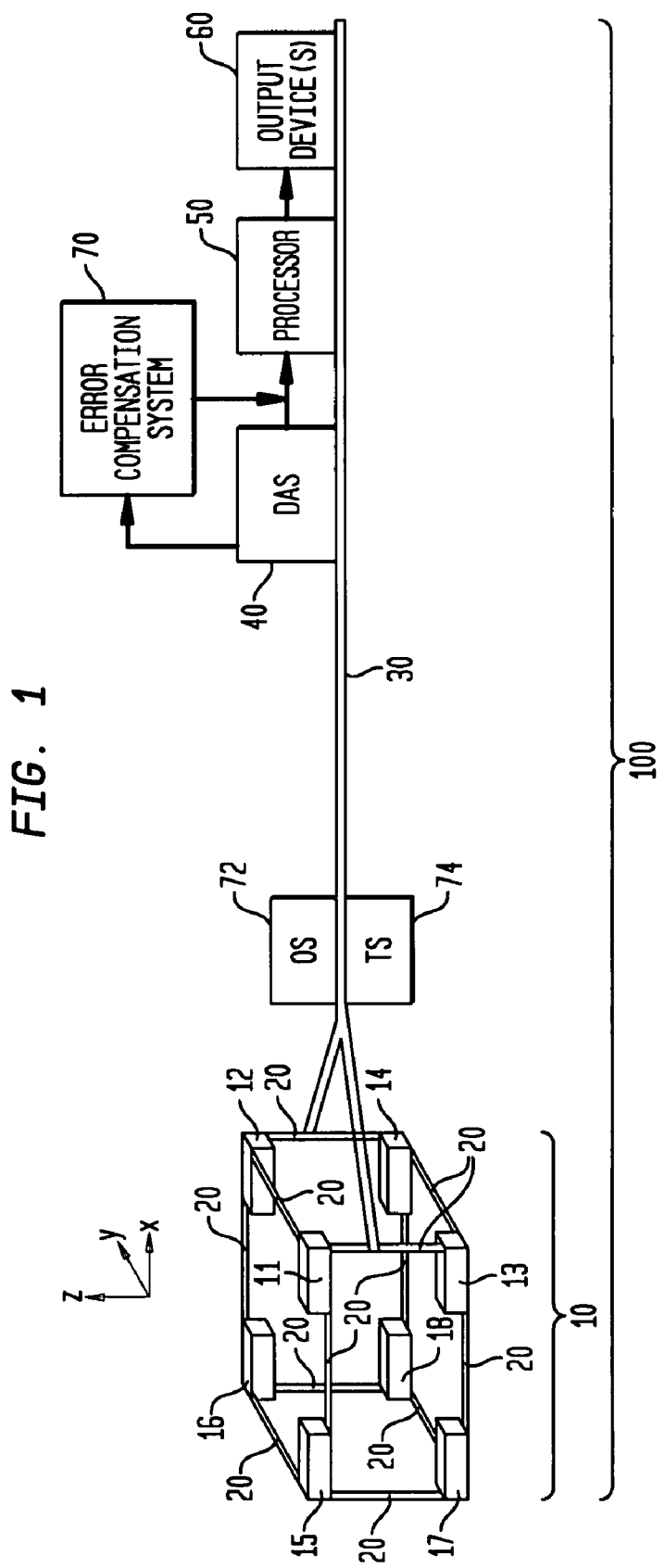
FIG. 1 is a schematic view of a portable magnetic anomaly sensing system in accordance with an embodiment of the present invention.

Referring now to the drawings and more particularly to FIG. 1, a portable magnetic anomaly sensing system for real-time, point-by-point "Detection, Localization and Classification" (DLC) of magnetic targets in accordance with the present invention is shown and is referenced generally by numeral 100. The term "target" as used herein refers to any natural or man-made object residing on/under the ground or in the water, with the object having an inherent magnetic signature owing to the ferrous material(s) that are included in the object's physical structure.

At the heart of portable system 100 is a magnetic anomaly sensing system 10 that can passively measure magnetic gradient tensors associated with the magnetic signature of a target, and then convert the tensor data to gradient contraction scalars. The basic features of such magnetic anomaly sensing systems are disclosed in detail in U.S. Pat. Nos. 6,476,610 and 6,841,994, the entire contents of which are hereby incorporated by reference.

Briefly, magnetic anomaly sensing system 10 uses a plurality of triaxial magnetometer (TM) sensors 11-18 with each of the TM sensors having X,Y,Z magnetic sensing axes. TM sensors 11-18 are arranged in a three-dimensional cubic array with respective ones of the X,Y,Z magnetic sensing axes being mutually parallel to one another in the three-dimensional array. Thus, the three-dimensional cubic array of TM sensors defines a geometry that forms a plurality of single-axis gradiometers with each such gradiometer defined between vertices of the cubic array. Each of TM sensors 11-18 senses a local magnetic field and outputs magnetic field data indicative thereof in an analog fashion. The magnetic field and analog data associated therewith is output for each of the three X,Y,Z sensing axes of a TM sensor.

TM sensors 11-18 are coupled together in their above-described relationship in a fixed and rigid fashion by non-magnetic frame members 20. Rigidly coupled to one or more of frame members 20 is a rigid non-magnetic standoff or beam 30 that serves to displace sensing system 10 from the processing portion of portable system 100 which will typically include elements that have a magnetic signature. Accordingly, beam 30 is sized so that sensing system 10 (i.e., TM sensors 11-18) either cannot detect/sense the magnetic signature of any elements included in the processing portion of portable system 100 or, if any magnetic signatures are detected, they are not significant enough to adversely affect accuracy of the TM sensors. Further, if necessary, the existence of any such stray magnetic signatures can be "calibrated out" using, for example, an imbalance error compensation methodology that will be described later below.

In general, the processing portion of portable system 100 includes a synchronized "data acquisition system" (DAS) 40, a processor 50, and one or more output devices 60. A "magnetically clean" operator (not shown), i.e., an operator with no significant magnetic structure, would typically grasp beam 30 near the center of gravity of portable system 100. Briefly, the analog outputs of TM sensors 11-18 are provided to and sampled by synchronized DAS 40. Since portable system 100 will typically be hand-held or mounted on a moving platform, sensing system 10 will typically be experiencing at least small amounts of movement at all times. Furthermore, since there is a large Earth magnetic field and relatively small magnetic signatures associated with targets of interest, it is critical in the present invention to sample the analog data from TM sensors 11-18 simultaneously or nearly simultaneously. DAS 40 achieves such synchronous sampling through the use of a precise timing signal as will be explained further below.

DAS system 40 essentially digitizes all TM sensor outputs simultaneously (or nearly simultaneously) with the digitized magnetic field data being provided to processor 50 which implements a magnetic "scalar triangulation and ranging" (STAR) processing scheme. For clarity of illustration, signal lines coupling TM sensors 11-18 to DAS 40 are not shown. The particular STAR processing scheme is not a limitation of the present invention. Examples of suitable processing schemes are disclosed in U.S. Pat. No. 6,814,994, and in U.S. patent application Ser. No. (Navy case 98711). Further, more than one STAR processing scheme could be implemented by processor 50 with the results thereof being correlated to verify data accuracy.

Regardless of the choice or number of STAR processing scheme(s) implemented by processor 50, the digitized magnetic field data is first evaluated to see if a threshold level is exceeded where such condition is indicative of the presence of a magnetic target. When the threshold level is exceeded, the digitized magnetic field data is used to generate both a position vector r and a magnetic movement vector M. As is known in the STAR processing art, the position vector r provides an elevation, bearing and range to a target from the location of sensing system 10, and the magnetic moment vector M provides information needed to classify the magnetic target at the bearing and range indicated by the position vector r.

The range, elevation, bearing, and classification of a detected magnetic target are provided to output device(s) 60 for presentation of an operator. Typically, this data set is presented visually on a display and/or audibly via speakers 10, the raw data is preferably processed to compensate for measurement errors due to system imbalances caused by mechanical and electrical misalignments, and even temperature differentials. Accordingly, the processing portion of portable system 100 preferably includes an error compensation system 70 that adjusts the raw digitized magnetic field data from DAS 40 prior to the processing thereof by processor 50. Error compensation 70 would typically be incorporated into processor 50, but is illustrated as a separate element for clarity of illustration.

Error compensation system 70 receives sensor inputs from one or more of (i) TM sensors 11-18, (ii) an orientation sensor ("OS") 72, and (iii) temperature sensor(s) ("TS") 74. Once again, for clarity of illustration, signal lines coupling sensors 72 and 74 to error compensation system 70 are not shown. Orientation sensor 72 is typically positioned on beam 30 or frame members 20 in order to provide heading, pitch, roll and acceleration for all of gradient sensors 201-204. Only one orientation sensor is needed since all sensors are fixed in their relationships to one another and have their sensing axes aligned with one another as described above. A commercially available orientation sensor capable of providing this data is a Model 3DM-GX1 orientation sensor manufactured by Micro Strain Inc., Williston, Vt. Temperature sensor(s) 74 can also be placed on beam 30, on frame member 20, and/or incorporated with TM sensors 11-18.

The heading, pitch, roll, and acceleration data collected by orientation sensor 72 can be used by processor 50 to adjust the raw magnetic field gradients generated from the magnetic field data sensed by TM sensors 11-18. Details or some other type of audio generator.

The digitized magnetic field data can be used in its raw or uncompensated form as just described. However, in order to optimize the range and accuracy of sensing system of orientation compensation using heading, pitch, roll, and acceleration data are provided in the previously-referenced U.S. Pat. No. 6,476,610.

Since the outputs of TM sensors 11-18 can vary as a function of temperature, the temperature data collected by temperature sensor(s) 74 can also be used by processor 50 to adjust the raw magnetic field gradients. At a given temperature, the raw magnetic field gradient data can be compensated using just pre-calibrated magnetic field data, just orientation data, or a combination of magnetic field and orientation data that correspond to the measured temperature data without departing from the scope of the present invention.

Prior to using the present invention, it is preferred to calibrate the system. For example, a preferred imbalance error compensation method involves a pre-calibration procedure that is performed prior to using the invention to search for magnetic targets. Briefly, the calibration procedure and its application to real-time DLC of magnetic targets consist of:

(i) rotating the sensor system in heading, pitch and roll in a magnetic-gradient-free region while collecting B-field data, gradient data and, optionally, orientation sensor data and temperature data;

(ii) applying a mathematical transformation that will minimize the gradient errors that were measured; and (iii) storing parameters for the transformation.

Still further, other forms of error compensation could also be used. For example, U.S. patent application Ser. No. 11/417,279, filed Apr. 17, 2006, discloses a unique method of compensating for "asphericity errors" that can be associated with STAR-type magnetic anomaly sensing systems. Briefly, this asphericity error compensation method uses the STAR-determined values of r and M as initial parameters in a least-squares-fit approach based on magnetic gradient tensor equations to iteratively generate more accurate solutions for the position vector r and magnetic movement vector M.

In use of the present invention, the operator carries portable system 100 in a region where there may be magnetic anomalies or "targets." As the operator searches for targets, the invention's processor automatically (i) measures B-field and, optionally, orientation and temperature data, (ii) applies the above-determined transformation(s) that most closely correspond to the actual temperature of operation to generate motion-noise-compensated gradients, and (iii) uses the motion-noise-compensated gradients in a STAR-type method to perform real-time, point-by-point detection, localization and classification of magnetic targets.

Figure 2:
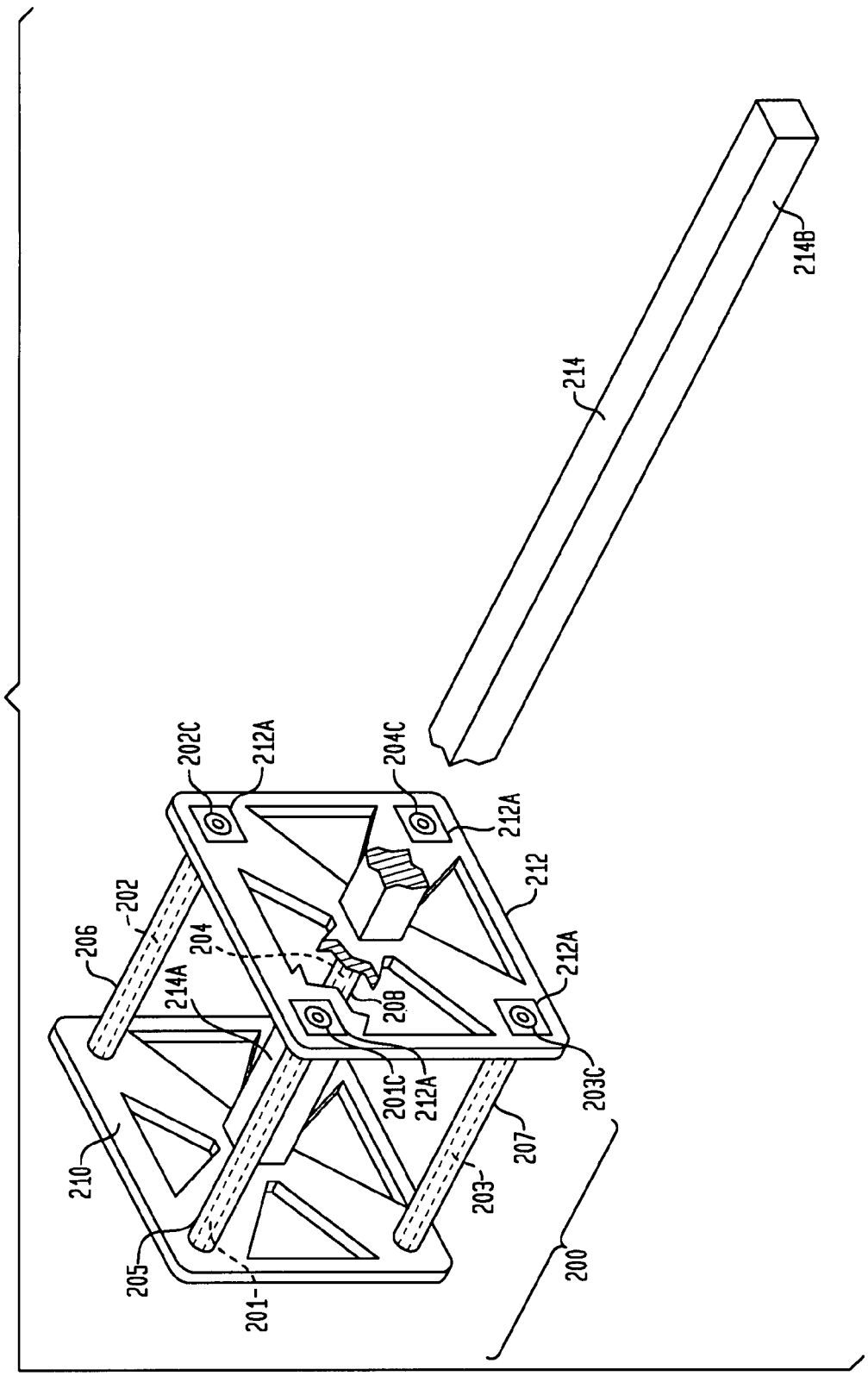
FIG. 2 is an isolated perspective view of an embodiment of a sensing system and its support structure in accordance with the present invention.

By way of example, a specific embodiment of the present invention will now be explained with the aid of FIGS. 2 and 3. FIG. 2 illustrates just the sensing system and its support structure, and the beam that couples the sensing system/support structure to the processing portion (not shown) of the present invention. FIG. 3 is a schematic view of the data collection/processing portion of the present invention's specific embodiment.

Referring first to FIG. 2, the sensing system is comprised of four chemically-available magnetic gradient sensors 201, 202, 203, and 204 (indicated by dashed lines) mounted within protective tubes 205-208, respectively. Each of gradient sensors 201-204 is a Model Grad-03-300L fluxgate-based magnetic gradient sensor manufactured by Bartington Instruments, Ltd., Oxford, U.K. Briefly, each of gradient sensors 201-204 is comprised of two triaxial fluxgate magnetometers (not shown in FIG. 2 for clarity of illustration) spaced apart from one another on a stable support beam (also not shown in FIG. 2) with this assembly being housed within a non-magnetic and rigid carbon fiber tube. Gradient sensors 201-204 are arranged along four parallel edges of a square by tubes 205-208 so that the eight triaxial fluxgate magnetometers associated with gradient sensors 201-204 reside on the vertices of a cube similar to the cubic array of TM sensors 11-18 (FIG. 1).

To fix gradient sensors 201-204 in the square arrangement, two non-magnetic and rigid end frame 210 and 212 are coupled to either ends of the four hollow carbon fiber tubes 205-208 to thereby form a rigid sensor support structure 200. For example, ends of tubes 205-208 can attached to end frames 210 and 212 using a non-magnetic fastening cement such as epoxy glue. Each of gradient sensors 201-204 can then be rigidly mounted inside a respective one of tubes 205-208 using non-magnetic brackets such as brackets 212A that are visible in FIG. 2. Electrical connectors 201C-204C for gradient sensors 201-204 protrude slightly from brackets 212A. Each of end frames 210 and 212 is an open-framework plate of carbon fiber material that is both rigid and light. Frames 210 and 212 can be square (as shown) but need not be as they are only required to be sized/shaped to define/support the square arrangement of tubes 205-208. The fixing of gradient sensors 201-204 within tubes 205-208 should be done in a non-magnetic fashion (e.g., using non-magnetic brackets, etc.), but can be accomplished in a variety of ways without departing from the scope of the present invention.

Each of frames 210 and 212 is further configured to receive and attach to the distal end region 214A of a beam 214 at a central portion of frames 210 and 212. In this way, distal end region 214A passes through the central portion of the cubic array of TM sensors defined by gradient sensors 201-204. This allows the sensing portion of the present invention to be balanced for ease of handling since an operator will typically grasp beam 214 near its balance point that resides between distal end region 214A and proximal end region 214B.

If the above-described structure is to be used in a portable system that includes error compensation, orientation and/or temperature sensors (not shown) could be mounted on one of frames 210/212 or on beam 214. Note that if the above-mentioned Barrington Instruments gradient sensor is used, a temperature sensor is provided as part of each gradient sensor.

Referring now to FIG. 3, the data collection and processing portion of a specific embodiment of the present invention is illustrated. Raw magnetic field data from each of gradient sensors 201-204 is sensed and output therefrom. For example, TM sensors 201A and 201B sense and output the three X, Y, Z components of B-field data as $B_A$ and $B_B$, respectively. The six channels of raw B-field data are passed to a corresponding "analog-to-digital converter" (ADC) 221-224. Preferably, the ADC should have a wide dynamic range in order to minimize the effects of "digitization noise" on sensor system performance. A commercially-available ADC for this purpose is the Model PS6-24 24-bit digitizer manufactured by Earth Data Ltd., South Hampton, United Kingdom. Each ADC 221-224 is provided with a timing signal from a suitable source such as a digital clock (not shown) or preferably as GPS receiver 230 so that the sampling or digitization of the analog B-field data from all sensors 201-204 is synchronized to the same instant of time. By using a GPS receiver to provide the timing synchronization in the present invention, absolute position and time/date data are also collected in synchrony with magnetic field data. The position data can be used with the determined range and bearing to define the absolute location of any magnetic targets detected, localized and classified by the present invention.

The digitized magnetic field data is passed to a processor 240 that preferably can implement error compensation processing 242; the details of which were described above with respect to error compensation system 70. If this is the case, orientation data 244 and/or temperature data 246 can be provided to error compensation processing 242. The error-compensated magnetic field data (or raw magnetic field data if compensation processing 242 is not used) is next processed by a magnetic field data STAR processing scheme 248. Again, one or more STAR processing schemes can be employed to determine the position vector r (i.e., range and bearing to the target) and magnetic moment vector M (i.e., the target classification).

The range, elevation, bearing and classification data are provided to one or more input/output (I/O) devices 250. With respect to inputs, I/O devices 250 provide a user with an input interface to control operation of the present invention. With respect to outputs, I/O devices 250 can include a heads-up display that can be worn by an operator. Additionally or alternatively, I/O devices 250 can include an audio generator that can provide an audio alarm, synthesized voice, etc. when, for example, a target object is detected, a target object is a particular type or size, etc. I/O devices 250 can include memory for storing raw data, error-compensated data and the localization and classification parameters of detected magnetic targets. Such memory could also be provided at or in conjunction with processor 240. Stored data would then be available for later retrieval or archival purposes.

Although not illustrated, some type of electrical power source will be provided for the various electrical components and/or systems used in the present invention. For example, rechargeable, high power-density lithium-ion or lithium polymer batteries could be used owing to their light weight and their ability to provide power for relatively long periods of time.

The advantages of the present invention are numerous. A very rigid and lightweight precision sensor support structure facilitates collimation of the TM sensors and maintains the array in strict alignment. The invention's synchronous data acquisition using a wide-dynamic-range, multichannel ADC system enables development of new and improved magnetic anomaly signal processing methods. The portable system can also utilize near real-time compensation for errors in mechanical and electrical alignment and temperature-related imbalance errors in the magnetic field and gradient data. As a result, the present invention provides a portable magnetic sensing system that can be hand-carried by a single individual and perform effective real-time, point-by-point DLC of magnetic targets.

In general, the present invention's technology can be used wherever portable, motion-noise-resistant, real-time, point-by-point DLC of magnetic targets is required. The present invention's technology can be hand-carried or can be readily adapted to a wide variety of highly mobile sensing platforms such as "Autonomous Unmanned Vehicle" (AUV). The AUVs could be any form of land-based, free-swimming (aquatic), or flying (aerial) sensing platform. Still other applications include (i) localization of hidden and buried magnetic objects such as UXO, underground pipes, buried utilities such as power lines, mines, submarines, (ii) various harbor defense and homeland security applications including monitoring of border crossings and identification and tracking of vessels entering a harbor, (iii) magnetic target homing operations, and (iv) traffic control applications involving localization, monitoring and tracking of motor vehicles.

Although the invention has been described relative to a specific embodiment thereof, there are numerous variations and modifications that will be readily apparent to those skilled in the art in light of the above teachings. For example, the invention could use non-cubic arrays of TM sensors in accordance with the teachings of the '994 patent and the TM sensors could include digitizers that would provide digital outputs rather than analog outputs. Also, if low magnetic signature components are used throughout, the data acquisition system and processor could be brought close to the TM sensors and/or carried by the operator in a backpack rather than at the end of a beam. It is therefore to be understood that, within the scope of the appended claims, the invention may be practiced other than as specifically described.

What is claimed as new and desired to be secured by Letters Patent of the United States is:

1. A portable magnetic anomaly sensing system, comprising:
    a non-magnetic rigid beam having first and second ends;
    a non-magnetic rigid frame coupled to said beam in proximity to said first end thereof, said frame encompassing a three-dimensional cubic space;
    a plurality of triaxial magnetometer (TM) sensors rigidly coupled to said frame with one of said TM sensors positioned at each vertex of said cubic space, each of said TM sensors having X,Y,Z magnetic sensing axes, said TM sensors positioned such that respective ones of said X,Y,Z magnetic sensing axes are mutually parallel to one another, each of said TM sensors measuring a local magnetic field and generating magnetic field data indicative thereof;
    a data acquisition system mechanically coupled to said beam in proximity to said second end thereof such that any magnetic elements of said data acquisition system do not adversely affect accuracy of said TM sensors, said data acquisition system electrically coupled to said TM sensors for sampling said magnetic field data synchronously with a timing signal wherein digitized magnetic field data is generated;
    processing means mechanically coupled to said beam in proximity to said second end thereof such that any magnetic elements of said processing means do not adversely affect accuracy of said TM sensors, said processing means electrically coupled to said data acquisition system for processing said digitized magnetic field data in accordance with a magnetic scalar triangulation and ranging (STAR) processing scheme to determine a position vector and a magnetic moment vector from said digitized magnetic field data; and
    output generation means coupled to said processing means for generating a human-discernable output of said position vector and said magnetic moment vector.

2. A portable magnetic anomaly sensing system as in claim 1 wherein said data acquisition system includes a Global Positioning System for generating said timing signal.

3. A portable magnetic anomaly sensing system as in claim 1 wherein said beam is aligned with the center of said cubic space.

4. A portable magnetic anomaly sensing system as in claim 3 further comprising sensing means mechanically coupled to said beam in proximity to said first end thereof, said sensing means sensing heading, pitch, roll and acceleration of said TM sensors, said sensing means further electrically coupled to said processing means wherein, prior to being processed in accordance with said STAR processing scheme, said digitized magnetic field data is adjusted using said heading, pitch, roll and acceleration of said TM sensors.

5. A portable magnetic anomaly sensing system as in claim 1 wherein said output generation means comprises at least one of a visual display and an audio generator.

6. A portable magnetic anomaly sensing system as in claim 5 wherein said visual display comprises a heads-up display.

7. A portable magnetic anomaly sensing system as in claim 1 further comprising temperature sensing means mechanically coupled to said frame for sensing temperature of an ambient environment in which said TM sensors reside, said temperature sensing means further electrically coupled to said processing means wherein, prior to being processed in accordance with said STAR processing scheme, said digitized magnetic field data is adjusted based on said temperature.

8. A portable magnetic anomaly sensing system, comprising:
    a non-magnetic rigid beam having first and second ends;
    a non-magnetic support structure rigidly coupled to said beam in proximity to said first end thereof, said support structure including four hollow tubes arranged parallel to one another along four edges of a cubic space;
    four magnetic gradient sensors with each of said sensors rigidly mounted within one of said hollow tubes, each of said sensors measuring magnetic field data along each of three mutually orthogonal directions, said sensors positioned such that respective ones of said directions are mutually parallel to one another;
    a data acquisition system mechanically coupled to said beam in proximity to said second end thereof such that any magnetic elements of said data acquisition system do not adversely affect accuracy of said sensors, said data acquisition system electrically coupled to said sensors for sampling said magnetic field data synchronously with a timing signal wherein digitized magnetic field data is generated;
    processing means mechanically coupled to said beam in proximity to said second end thereof such that any magnetic elements of said processing means do not adversely affect accuracy of said sensors, said processing means electrically couple to said data acquisition system for processing said digitized magnetic field data in accordance with a magnetic scalar triangulation and ranging (STAR) processing scheme to determine a position vector and a magnetic moment vector from said digitized magnetic field data; and
    output generation means coupled to said processing means for generating a human-discernable output of said position vector and said magnetic moment vector.

9. A portable magnetic anomaly sensing system as in claim 8 wherein said beam is coupled to a central portion of said support structure.

10. A portable magnetic anomaly sensing system as in claim 8 wherein said data acquisition system includes a Global Positioning System for generating said timing signal.

11. A portable magnetic anomaly sensing system as in claim 8 further comprising sensing means mechanically coupled to said beam in proximity to said first end thereof, said sensing means sensing heading, pitch, roll and acceleration of said sensors, said sensing means further electrically coupled to said processing means wherein, prior to being processed in accordance with said STAR processing scheme, said digitized magnetic field data is adjusted using said heading, pitch, roll and acceleration of said TM sensors.

12. A portable magnetic anomaly sensing system as in claim 8 wherein said output generation means comprises at least one of a visual display and an audio generator.

13. A portable magnetic anomaly sensing system as in claim 12 wherein said visual display comprises a heads-up display.

14. A portable magnetic anomaly sensing system as in claim 8 further comprising temperature sensing means mechanically coupled to said frame for sensing temperature of an ambient environment in which said sensors reside, said temperature sensing means further electrically coupled to said processing means wherein, prior to being processed in accordance with said STAR processing scheme, said digitized magnetic field data is adjusted based on said temperature.

15. A portable magnetic anomaly sensing system, comprising:
- a non-magnetic rigid beam having first and second ends;
- a non-magnetic rigid frame coupled to said beam in proximity to said first end thereof, said frame defining a three-dimensional cubic space;
- a plurality of triaxial magnetometer (TM) sensors rigidly coupled to said frame with one of said TM sensors positioned at each vertex of said cubic space, each of said TM sensors having X,Y,Z magnetic sensing axes, said TM sensors positioned such that respective ones of said X,Y,Z magnetic sensing axes are mutually parallel to one another, each of said TM sensors measuring a local magnetic field and generating magnetic field data indicative thereof;
- a data acquisition system mechanically coupled to said beam in proximity to said second end thereof such that any magnetic elements of said data acquisition system do not adversely affect accuracy of said TM sensors, said data acquisition system including a Global Positioning System for generating a timing signal, said data acquisition system electrically coupled to said TM sensors for sampling said magnetic field data synchronously with said timing signal wherein digitized magnetic field data is generated;
- processing means mechanically coupled to said beam in proximity to said second end thereof such that any magnetic elements of said processing means do not adversely affect accuracy of said TM sensors;
- sensing means mechanically coupled to at least one of said beam and said frame in proximity to said first end of said beam, said sensing means sensing heading, pitch, roll and acceleration of said TM sensors and sensing temperature of an ambient environment in which said TM sensors reside;
- said processing means electrically coupled to said data acquisition means and said sensing means, said processing means adjusting said digitized magnetic field data using said heading, pitch, roll and acceleration of said TM sensors and based on said temperature of the ambient environment to generate compensated magnetic field data;
- said processing means processing said compensated magnetic field data in accordance with a magnetic scalar triangulation and ranging (STAR) processing scheme to determine a position vector and a magnetic moment vector from said compensated magnetic field data; and
- output generation means coupled to said processing means for generating a human-discernable output of said position vector and said magnetic moment vector.

16. A portable magnetic anomaly sensing system as in claim 15 wherein said beam is aligned with the center of said cubic space.

17. A portable magnetic anomaly sensing system as in claim 15 wherein said output generation means comprises at least one of a visual display and an audio generator.

18. A portable magnetic anomaly sensing system as in claim 17 wherein said visual display comprises a heads-up display.

* * * * *